(12) United States Patent
Martin et al.

(10) Patent No.: US 11,152,814 B2
(45) Date of Patent: Oct. 19, 2021

(54) MOBILE CHARGING STATIONS WITH FUEL-CELL GENERATORS FOR ELECTRIC-DRIVE VEHICLES

(71) Applicant: GM GLOBAL TECHNOLOGY OPERATIONS LLC, Detroit, MI (US)

(72) Inventors: Alan B. Martin, Washington, MI (US); Matthew C. Kirklin, Lake Orion, MI (US); Charles E. Freese, V, Ira Township, MI (US); Margarita M. Mann, Royal Oak, MI (US); William H. Pettit, Rochester, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 96 days.

(21) Appl. No.: 16/691,921

(22) Filed: Nov. 22, 2019

(65) Prior Publication Data

US 2021/0155108 A1    May 27, 2021

(51) Int. Cl.
*H02J 7/00* (2006.01)
*H02J 7/34* (2006.01)
(Continued)

(52) U.S. Cl.
CPC .............. *H02J 7/342* (2020.01); *B60L 53/12* (2019.02); *B60L 53/14* (2019.02); *B60L 53/305* (2019.02); *B60L 53/35* (2019.02); *B60L 53/54* (2019.02); *B62D 65/10* (2013.01); *B62D 65/12* (2013.01); *H01M 10/441* (2013.01); *B60K 6/22* (2013.01); *B60Y 2200/91* (2013.01);
(Continued)

(58) Field of Classification Search
CPC .......... H02J 7/342; H02J 7/0045; H02J 50/10; B62D 65/10; B62D 65/12; B60L 53/12; B60L 53/35; B60L 53/54; B60L 53/305; B60L 53/14; H01M 10/441; H01M 2220/20; B60Y 2200/91; B60Y 2200/92; G05D 1/0212; B60K 6/22
See application file for complete search history.

(56) References Cited

U.S. PATENT DOCUMENTS 4,700,301 A  *  10/1987  Dyke ........................ G01S 5/16
                                                                    180/169
6,275,004 B1     8/2001  Tamai et al.
(Continued)

*Primary Examiner* — Naum Levin
(74) *Attorney, Agent, or Firm* — Quinn IP Law

(57) ABSTRACT

Presented are mobile charging stations for recharging electrified vehicles, methods for making/using such mobile charging stations, and parking facilities equipped with such mobile charging stations. A mobile charging station includes a frame with multiple drive wheels and a prime mover operable to drive the wheels to propel the charging station. A hydrogen storage container and fuel cell are mounted to the frame. The fuel cell oxidizes hydrogen received from the storage container to generate electrical current. An electrical coupling mechanism connects the fuel cell to a traction battery pack of an electric-drive vehicle. A resident or remote controller is programmed to receive charge requests to recharge vehicles, and responsively determines path plan data for the mobile charging station. The controller commands the prime mover to propel the mobile charging station from the charger's origin to a charger destination, and enables the fuel cell to transmit electrical current to the vehicle.

20 Claims, 4 Drawing Sheets

(51) Int. Cl.

| | | |
|---|---|---|
| *B60L 53/35* | (2019.01) | |
| *H01M 10/44* | (2006.01) | |
| *B60L 53/54* | (2019.01) | |
| *B60L 53/30* | (2019.01) | |
| *B60L 53/12* | (2019.01) | |
| *B60L 53/14* | (2019.01) | |
| *B62D 65/10* | (2006.01) | |
| *B62D 65/12* | (2006.01) | |
| *H02J 50/10* | (2016.01) | |
| *G05D 1/02* | (2020.01) | |
| *B60K 6/22* | (2007.10) | |

(52) U.S. Cl.
CPC ....... *B60Y 2200/92* (2013.01); *B60Y 2300/91* (2013.01); *G05D 1/0212* (2013.01); *H01M 2220/20* (2013.01); *H02J 7/0045* (2013.01); *H02J 50/10* (2016.02)

(56) References Cited

U.S. PATENT DOCUMENTS

| | | | |
|---|---|---|---|
| 6,928,141 B2 * | 8/2005 | Carver | G01V 5/0008 378/57 |
| 7,097,532 B1 * | 8/2006 | Rolicki | A63H 17/28 446/175 |
| 7,169,489 B2 * | 1/2007 | Redmond | C01B 3/0084 429/515 |
| 7,810,476 B2 | 10/2010 | Wang et al. | |
| 7,910,257 B2 * | 3/2011 | Katano | B60L 58/30 429/444 |
| 8,091,416 B2 | 1/2012 | Wang et al. | |
| 8,201,444 B2 | 6/2012 | Wang et al. | |
| 8,276,373 B2 | 10/2012 | Wang et al. | |
| 8,307,922 B2 * | 11/2012 | Perlman | B60K 6/46 180/2.1 |
| 8,392,091 B2 | 3/2013 | Hebbale et al. | |
| 8,565,949 B2 | 10/2013 | Christman et al. | |
| 8,612,119 B2 | 12/2013 | Wang et al. | |
| 8,694,197 B2 | 4/2014 | Rajagopalan et al. | |
| 9,058,578 B2 | 6/2015 | Jones et al. | |
| 9,133,750 B2 | 9/2015 | Levijoki et al. | |
| 9,142,980 B2 | 9/2015 | Lee | |
| 9,153,980 B2 | 10/2015 | Restrepo et al. | |
| 9,296,311 B2 * | 3/2016 | Kawase | H01M 8/04753 |
| 9,365,124 B2 | 6/2016 | Soden et al. | |
| 9,450,258 B2 * | 9/2016 | Lee | H01M 8/04447 |
| 9,592,742 B1 * | 3/2017 | Sosinov | B60L 53/126 |
| 9,660,462 B2 | 5/2017 | Jeon | |
| 9,679,948 B2 * | 6/2017 | Kim | H01L 27/14629 |
| 9,718,371 B2 | 8/2017 | Anglin et al. | |
| 9,770,993 B2 * | 9/2017 | Zhao | B60L 53/126 |
| 9,778,653 B1 * | 10/2017 | McClintock | B60L 53/65 |
| 9,839,986 B2 * | 12/2017 | Best | B05B 13/005 |
| 9,963,038 B2 | 5/2018 | Ortiz et al. | |
| 10,059,215 B1 * | 8/2018 | Haberman | B60L 53/66 |
| 10,150,357 B2 * | 12/2018 | Landgraf | B60L 53/54 |
| 10,207,592 B1 | 2/2019 | Warden et al. | |
| 10,373,238 B2 * | 8/2019 | Hill | B60L 53/80 |
| 10,384,871 B2 * | 8/2019 | Zuckerman | B65G 1/0414 |
| 10,391,873 B2 * | 8/2019 | Kohnke | G05D 1/0088 |
| 10,553,916 B2 * | 2/2020 | Johnson | H01M 10/443 |
| 2008/0051973 A1 | 2/2008 | Gangopadhyay et al. | |
| 2008/0265835 A1 | 10/2008 | Reed et al. | |
| 2008/0284385 A1 | 11/2008 | Namuduri et al. | |
| 2009/0030712 A1 | 1/2009 | Bogolea et al. | |
| 2010/0084208 A1 * | 4/2010 | Chen | B60L 58/34 180/65.31 |
| 2010/0198754 A1 | 8/2010 | Jones et al. | |
| 2011/0215767 A1 | 9/2011 | Johnson et al. | |
| 2011/0248675 A1 | 10/2011 | Shiu et al. | |
| 2012/0005031 A1 * | 1/2012 | Jammer | B60L 53/305 705/16 |
| 2012/0085082 A1 | 4/2012 | Levijoki et al. | |
| 2012/0181854 A1 | 7/2012 | Gopalakrishnan et al. | |
| 2012/0181953 A1 | 7/2012 | Hsu et al. | |
| 2012/0206296 A1 | 8/2012 | Wan | |
| 2012/0286063 A1 | 11/2012 | Wang et al. | |
| 2013/0027048 A1 | 1/2013 | Schwarz et al. | |
| 2013/0038279 A1 | 2/2013 | Seyerle et al. | |
| 2013/0119935 A1 | 5/2013 | Sufrin-Disler et al. | |
| 2013/0127399 A1 | 5/2013 | Tang et al. | |
| 2014/0152232 A1 | 6/2014 | Johnson et al. | |
| 2014/0197776 A1 | 7/2014 | Schlaupitz et al. | |
| 2014/0360832 A1 * | 12/2014 | Aldrich | B60L 9/08 191/12.2 R |
| 2016/0052450 A1 | 2/2016 | Chan et al. | |
| 2016/0285296 A1 | 9/2016 | Namou et al. | |
| 2017/0307390 A1 | 10/2017 | Uyeki | |
| 2019/0009756 A1 * | 1/2019 | Jacobs | B60S 5/06 |
| 2019/0135125 A1 | 5/2019 | Sponheimer et al. | |
| 2019/0210479 A1 * | 7/2019 | Bachmann | G05D 1/0225 |
| 2019/0381910 A1 * | 12/2019 | Akhavan-Tafti | H02J 7/025 |
| 2020/0031248 A1 * | 1/2020 | Kwak | H02J 7/0042 |
| 2020/0044467 A1 * | 2/2020 | Sosinov | H01M 10/44 |
| 2020/0198594 A1 | 6/2020 | Petershagen | G05D 1/0276 |
| 2020/0376972 A1 * | 12/2020 | Martin | G01R 31/382 |
| 2020/0376974 A1 * | 12/2020 | Freese, V | B60L 53/54 |
| 2020/0376975 A1 * | 12/2020 | Martin | H01M 10/441 |

* cited by examiner

MOBILE CHARGING STATIONS WITH FUEL-CELL GENERATORS FOR ELECTRIC-DRIVE VEHICLES

INTRODUCTION

The present disclosure relates generally to electrical systems for charging motor vehicles. More specifically, aspects of this disclosure relate to systems, methods, and devices for provisioning deployable charging for electric-drive vehicles.

Current production motor vehicles, such as the modern-day automobile, are originally equipped with a powertrain that operates to propel the vehicle and power the vehicle's onboard electronics. In automotive applications, for example, the vehicle powertrain is generally typified by a prime mover that delivers driving power through an automatic or manually shifted power transmission to the vehicle's final drive system (e.g., differential, axle shafts, road wheels, etc.). Automobiles have historically been powered by a reciprocating-piston type internal combustion engine (ICE) assembly due to its ready availability and relatively inexpensive cost, light weight, and overall efficiency. Such engines include compression-ignited (CI) diesel engines, spark-ignited (SI) gasoline engines, two, four, and six-stroke architectures, and rotary engines, as some non-limiting examples. Hybrid electric and full electric vehicles, on the other hand, utilize alternative power sources to propel the vehicle and, thus, minimize or eliminate reliance on a fossil-fuel based engine for tractive power.

A full electric vehicle (FEV)—colloquially branded as an "electric car"—is a type of electric-drive vehicle configuration that altogether removes the internal combustion engine and attendant peripheral components from the powertrain system, relying solely on electric traction motors for propulsion and for supporting accessory loads. The engine assembly, fuel supply system, and exhaust system of an ICE-based vehicle are replaced with a single or multiple traction motors, a traction battery back, and battery cooling and charging hardware in an FEV. Hybrid electric vehicle (HEV) powertrains, in contrast, employ multiple sources of tractive power to propel the vehicle, most commonly operating an internal combustion engine assembly in conjunction with a battery-powered or fuel-cell-powered electric traction motor. Since hybrid-type, electric-drive vehicles are able to derive their power from sources other than the engine, hybrid electric vehicle engines may be turned off, in whole or in part, while the vehicle is propelled by the electric motor(s).

Many commercially available hybrid electric and full electric vehicles (collectively "electric-drive vehicles") employ a rechargeable traction battery pack to store and supply the requisite power for operating the powertrain's motor unit(s). In order to generate tractive power with sufficient vehicle range, a traction battery pack is significantly larger, more powerful, and higher in capacity than a 12-volt starting, lighting, and ignition (SLI) battery. Contemporary traction battery packs (also referred to as "electric vehicle battery" or "EVB") groups stacks of battery cells into individual battery modules that are mounted onto the vehicle chassis, e.g., via a battery housing or support tray. Some vehicle battery systems employ multiple independently-operable, high-voltage battery packs to provide higher voltage delivery and greater system capacity through increased amp-hours. A dedicated Battery Pack Control Module (BPCM) regulates the opening and closing of battery pack contactors to govern which pack or packs will power the vehicle's traction motor(s) at a given time. A high-voltage electric power system governs the transfer of electricity between the traction motor(s) and battery pack(s) of an electric-drive vehicle.

As hybrid and electric vehicles become more prevalent, infrastructure is being developed and deployed to make day-to-day use of such vehicles feasible and convenient. Electric vehicle supply equipment (EVSE) comes in many forms, including residential electric vehicle charging stations (EVCS) purchased and operated by a vehicle owner (e.g., installed in the owner's garage), publicly accessible EVCS disseminated by public utilities or private retailers (e.g., at gas stations or municipal charging stations), and sophisticated high-voltage, high-current charging stations used by manufacturers, dealers, and service stations. Plug-in hybrid and electric vehicles, for example, can be recharged by physically connecting a charging cable of the EVCS to a complementary charging port of the vehicle. By comparison, wireless electrical charging systems utilize electromagnetic field (EMF) induction or other suitable techniques to provide vehicle charging capabilities without the need for charging cables and cable ports. It is axiomatic that large-scale vehicle electrification in turn necessitates a concomitant buildout of readily accessible charging infrastructure that can support daily vehicle use in both urban and rural scenarios, for both short-distance and long-distance vehicle range.

SUMMARY

Presented herein are deployable mobile charging stations for recharging electric-drive vehicles, methods for making and methods for using such mobile charging stations, and vehicle parking facilities equipped with such mobile charging stations. By way of example, there are presented manually and self-propelled mobile charging devices to recharge batteries in vehicles parked in parking garages, parking lots, and other public or private parking facilities. Plug-in and induction direct current (DC) fast charging of electrified vehicles is enabled using a compact, high-amperage fuel cell system packaged inside a wheeled or rail-mounted EVCS. The mobile charging station uses locally stored hydrogen and, thus, eliminates the need for a combustion-based generator or wired electrical connections to utility power grids. Manual configurations may be sufficiently compact, lightweight, and mobilized to enable a single adult of average height and weight to manipulate the mobile charging station within a parking garage or lot. Autonomous implementations may automate the selective deployment of a fleet of mobile charging stations utilizing centralized and/or distributed control systems in conjunction with a network of rails, radio beacon transponders, radio-frequency (RF) emitting tracks, magnetic/colored tape, and/or via vision-guided mobility with device-embedded route planning.

Attendant benefits for many of the disclosed concepts may include eliminating the need for large-volume, grid-based EVCS that are permanently mounted to parking infrastructure. Deployable and sharable mobile charging stations eliminate the associated cost, maintenance, installation time, and dedicated space for fixed EVCS. Other attendant benefits include the use of fuel cells to enable vehicle charging, thus eliminating reliance on public electric grids that may be expensive (e.g., power factor and peak-demand penalties) or unavailable (e.g., power outages). To parking area owners, these mobile charging stations offer a relatively low financial investment as compared with installing EVCS at every spot or at every owned lot (i.e., mobile charge may can be shared amongst multiple vehicles and transported between multiple lots). To electric-drive vehicle owners, these mobile charging stations offer increased driving range with reduced range anxiety by enabling widespread charger distribution. To mobile charger owners/operators, these mobile charging stations offer zero hydrocarbon gas and particulate emissions, fast-charge capacity, high energy density, dynamic response to charging needs, and reduced-cost energy delivery.

Aspects of this disclosure are directed to fast charging station (FCS) mobile DC rapid chargers with fuel cell generators for recharging electrified vehicles. In an example, a mobile charging station is presented that includes a rigid frame supported on multiple drive wheels, and a prime mover (e.g., motor and/or engine) mounted to the frame and operable to drive one or more of these wheels to propel the mobile charging station. One or more hydrogen storage containers and an electrochemical fuel cell system are also mounted to the frame. The fuel cell is fluidly connected to the hydrogen storage container(s) and operable to oxidize hydrogen received therefrom to generate electrical current. Also mounted to the frame is one or more electrical coupling mechanisms, such as a plug-in electrical connector and/or an electromagnetic wireless charging pad, that operatively connects the fuel cell to a traction battery pack of an electric-drive vehicle.

Continuing with the above example, the mobile charging station also includes a resident or remote controller that communicates, either directly or through a resident control module, with the prime mover and fuel cell. The mobile charger's controller is programmed to receive charge request signals to recharge electric-drive vehicles, and responsively determines charger path plan information with charger location/origin data, vehicle location/charger destination data, route data, etc., for the mobile charging station. Using the derived path plan data, the controller commands the prime mover to propel the mobile charging station from the charger's origin to one or more charger destinations. This may include command signals to a resident steering system to carry out navigation operations, and command signals to a resident braking system to carry out intermittent stops to charge a series of parked vehicles. The controller concurrently enables the fuel cell to transmit electrical current to the traction battery pack of each waiting vehicle via an available electrical coupling mechanism.

Additional aspects of this disclosure are directed to parking facilities with a fleet of FCS mobile DC rapid chargers for recharging heterogeneous vehicle types. As used herein, the terms "vehicle" and "motor vehicle" may be used interchangeably and synonymously to include any relevant vehicle platform, such as passenger vehicles (e.g., internal combustion, hybrid electric, full electric, fuel cell, fully and partially autonomous, etc.), commercial vehicles, industrial vehicles, tracked vehicles, off-road and all-terrain vehicles (ATV), motorcycles, farm equipment, watercraft, aircraft, etc. In an example, a mobile charging system is presented for facilitating the recharging of multiple electric-drive vehicles that are parked, docked, or housed, for example, at a parking lot, dock, or garage. The mobile charging system includes a rail network and/or guided pathway that leads to an array of parking spots, each of which accommodates one of the waiting vehicles. The charging system also includes multiple mobile charging stations, such as those described in the preceding paragraphs, to recharge the parked vehicles.

Also presented herein are control algorithms and processing logic for making or for using any of the disclosed mobile charging systems and devices. In an example, a method is presented for assembling a mobile charging station for recharging a traction battery pack of an electric-drive vehicle. This representative method includes, in any order and in any combination with any of the above and below disclosed options and features: attaching a plurality of drive wheels to a charger frame; mounting a prime mover to the charger frame, the prime mover being operable to drive one or more of the drive wheels to thereby propel the mobile charging station; mounting a hydrogen storage container to the charger frame; mounting an electrochemical fuel cell to the charger frame; fluidly connecting the fuel cell to the hydrogen storage container, the fuel cell being configured to oxidize hydrogen received from the hydrogen storage container and thereby generate electrical current; mounting an electrical coupling mechanism to the charger frame, the electrical coupling mechanism being configured to operatively connect the fuel cell to the battery pack of the electric-drive vehicle; and communicatively connecting a mobile charger controller to the prime mover and the fuel cell. The mobile charger controller is programmed to carry out any of the control operations disclosed hereinabove and below.

The above summary is not intended to represent every embodiment or every aspect of the present disclosure. Rather, the foregoing summary merely provides an exemplification of some of the novel concepts and features set forth herein. The above features and advantages, and other features and attendant advantages of this disclosure, will be readily apparent from the following detailed description of illustrated examples and representative modes for carrying out the present disclosure when taken in connection with the accompanying drawings and the appended claims. Moreover, this disclosure expressly includes any and all combinations and subcombinations of the elements and features presented above and below.

Figure 1:
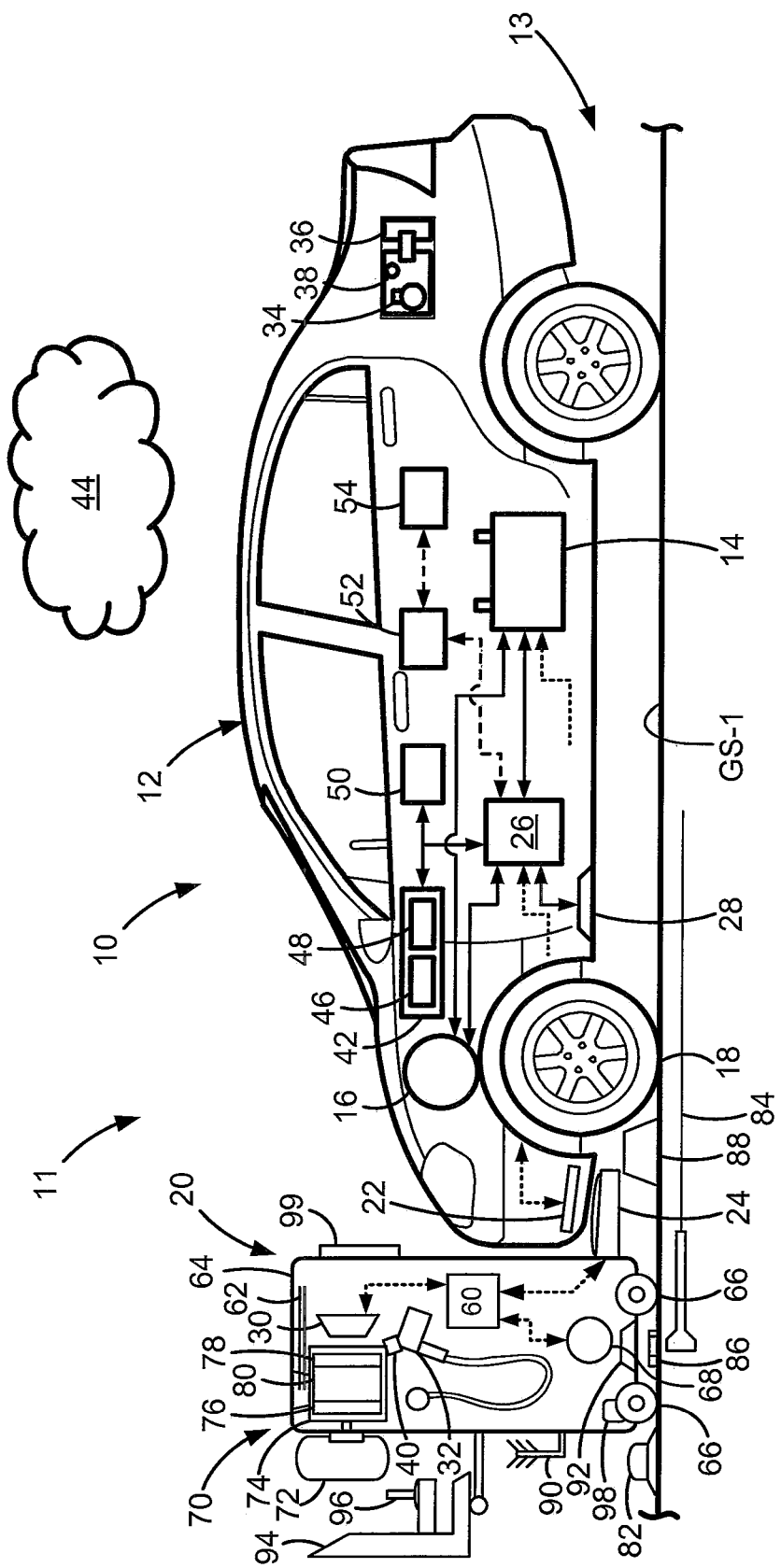
FIG. 1 is a partially schematic, side-view illustration of a trail-guided mobile charging station with a fuel-cell generator recharging a representative electric-drive vehicle in accordance with aspects of the present disclosure.

The present disclosure is amenable to various modifications and alternative forms, and some representative embodiments are shown by way of example in the drawings and will be described in detail herein. It should be understood, however, that the novel aspects of this disclosure are not limited to the particular forms illustrated in the above-enumerated drawings. Rather, the disclosure is to cover all modifications, equivalents, combinations, subcombinations, permutations, groupings, and alternatives falling within the scope of this disclosure as encompassed, for example, by the appended claims.

DETAILED DESCRIPTION

This disclosure is susceptible of embodiment in many different forms. Representative embodiments of the disclosure are shown in the drawings and will herein be described in detail with the understanding that these embodiments are provided as an exemplification of the disclosed principles, not limitations of the broad aspects of the disclosure. To that extent, elements and limitations that are described, for example, in the Abstract, Introduction, Summary, and Detailed Description sections, but not explicitly set forth in the claims, should not be incorporated into the claims, singly or collectively, by implication, inference or otherwise.

For purposes of the present detailed description, unless specifically disclaimed: the singular includes the plural and vice versa; the words "and" and "or" shall be both conjunctive and disjunctive; the words "any" and "all" shall both mean "any and all"; and the words "including," "containing," "comprising," "having," and the like, shall each mean "including without limitation." Moreover, words of approximation, such as "about," "almost," "substantially," "generally," "approximately," and the like, may each be used herein in the sense of "at, near, or nearly at," or "within 0-5% of," or "within acceptable manufacturing tolerances," or any logical combination thereof, for example. Lastly, directional adjectives and adverbs, such as fore, aft, inboard, outboard, starboard, port, vertical, horizontal, upward, downward, front, back, left, right, etc., may be with respect to a motor vehicle, such as a forward driving direction of a motor vehicle, when the vehicle is operatively oriented on a horizontal driving surface.

Figure 2:
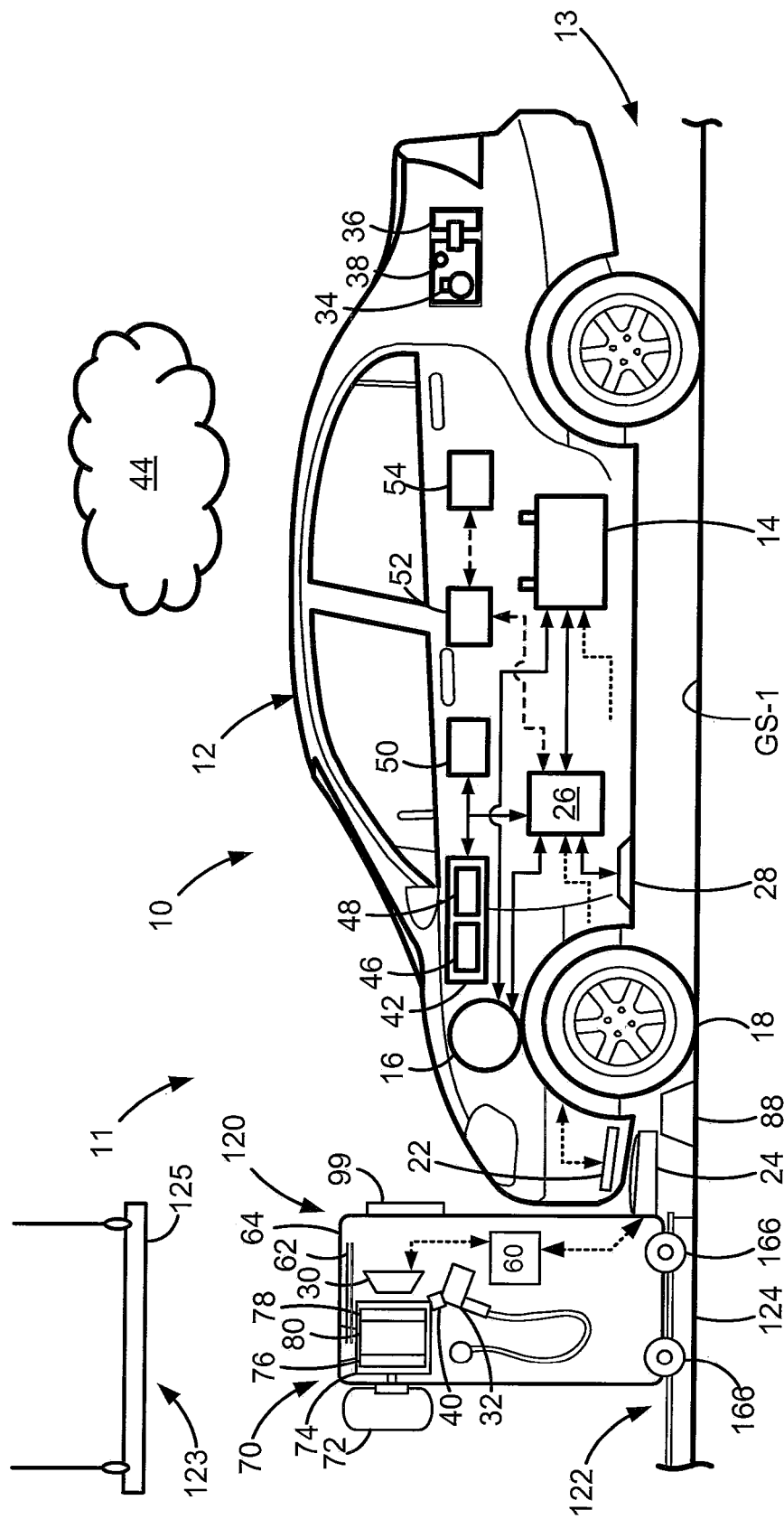
FIG. 2 is a partially schematic, side-view illustration of a rail-mounted mobile charging station with a fuel-cell generator recharging a representative electric-drive vehicle in accordance with aspects of the present disclosure.

Referring now to the drawings, wherein like reference numbers refer to the same or similar features throughout the several views, there is shown in FIGS. 1 and 2 a schematic illustration of a representative automobile, which is designated generally at 10 and portrayed herein for purposes of discussion as a sedan-style, hybrid electric or full electric ("electric-drive") passenger vehicle. Packaged within a vehicle body 12 of the automobile 10, e.g., inside a passenger compartment, trunk compartment, or dedicated battery compartment, is a traction battery pack 14 that powers an electric motor-generator unit (MGU) 16, which in turn drives one or more of the vehicle's road wheels 18 to thereby propel the vehicle 10. The illustrated automobile 10—also referred to herein as "motor vehicle" or "vehicle" for short—is merely an exemplary application with which aspects and features of this disclosure may be practiced. In the same vein, implementation of the present concepts for the specific electric vehicle supply equipment (EVSE) architectures illustrated in FIGS. 1 and 2 should also be appreciated as exemplary applications of the disclosed concepts and features. As such, it will be understood that aspects and features of this disclosure may be applied to other types of EVSE and implemented for any logically relevant type of vehicle. Moreover, only select components of the vehicle and EVSE have been shown and will be described in additional detail herein. Nevertheless, the motor vehicles and EVSE architectures discussed below can include numerous additional and alternative features, and other commercially available peripheral components, for example, to carry out the various protocols and algorithms of this disclosure.

FIG. 1 is a simplified illustration of the electric-drive vehicle 10 at rest in a parking spot 11 of a parking facility 13, and operably coupled to a mobile charging station 20 for recharging an onboard rechargeable energy storage system (RESS), such as a high-voltage direct current (DC) traction battery pack 14. Traction battery pack 14 may take on many suitable configurations, including an array of lead-acid, lithium-ion, or other applicable type of rechargeable electric vehicle batteries (EVB). To provide an operable coupling between the traction battery pack 14 and mobile charging station 20, the vehicle 10 may include an inductive charging component 22, e.g., with an integrated induction coil, that is mounted to the underside of the vehicle body 12. This inductive charging component 22 functions as a wireless charging interface that is compatible with a deployable wireless charging pad 24, e.g., with an internal EMF coil, of the mobile charging station 20. In the illustrated example, the mobile charging station 20 travels along a floor surface of the parking facility 13, and positions in accordance with a "target location" that serves as a desired location for purposes of efficient and effective wireless charging of the vehicle 10. In particular, FIG. 1 depicts the mobile charging station 20 stopped at a location determined to ensure the wireless charging pad 24 is substantially aligned in both lateral and longitudinal dimensions with the inductive charging component 22. Put another way, the vehicle 10 and charging station 20 of FIG. 1 are considered to be in proper fore-aft alignment and in proper starboard-port alignment with a designated target location to complete an inductive charging event for the vehicle 10.

The mobile charging station 20 may employ any heretofore and hereinafter developed type of wired and/or wireless charging technology, including inductive charging, radio charging, and resonance charging, as some non-limiting examples. In accordance with electromagnetic induction charging technology, the representative wireless charging pad 24 of FIG. 1 may be activated with electric current to generate an alternating electromagnetic field proximate the inductive charging component 22. This magnetic field, in turn, induces an electric current in the inductive charging component 22 of the vehicle 10. The induced current may be filtered, stepped-down, and/or phase-shifted by in-vehicle electrical modulation circuitry to charge the traction battery pack 14 or other energy source of the vehicle 10 (e.g., a standard 12V lead-acid starting, lighting, and ignition (SLI) battery, an auxiliary power module, etc.). Optimal wireless charging performance may be obtained when the vehicle 10 is aligned with the charging station 20 such that the maximum available EMF force is transferred by the wireless charging pad 24 to the inductive charging component 22.

Traction battery pack 14 stores energy that can be used for propulsion by the electric machine(s) 16 and for operating other vehicle electrical systems. The traction battery pack 14 is communicatively connected (wired or wirelessly) to one or more vehicle controllers, represented in FIG. 1 by electronic control unit (ECU) 26, that regulates the operation of various onboard vehicle components. Contactors controlled by the ECU 26, for example, may isolate the traction battery pack 14 from other components when opened, and connect the traction battery pack 14 to other components when closed. The ECU 26 is also communicatively connected to each electric motor-generator unit 16 to control, for example, bi-directional transfer of energy between the traction battery pack 14 and MGU 16. For instance, traction battery pack 14 may provide a DC voltage while the motor-generator(s) 16 may operate using a three-phase AC current; in such an instance, ECU 26 converts the DC voltage to a three-phase AC current for use by the motor-generator(s) 16. In a regenerative mode where the electric machine(s) 16 act as generators, the ECU 26 may convert three-phase AC current from the motor-generator(s) 16 to DC voltage compatible with the traction battery pack 14. The representative ECU 26 is also shown communicating with charging component 22, for example, to condition the power supplied from the mobile charging station 20 to the battery pack 14 to help ensure proper voltage and current levels. The ECU 26 may also interface with a resident charger controller 60 packaged inside the mobile charging station 20, for example, to coordinate the delivery of power from the charging station 20 to the vehicle 10.

Mobile charging station 20 of FIG. 1 also offers wired charging for electric vehicle 10 via a "plug-in" electrical connector 32, which may be one of a number of different commercially available electrical connector types. By way of non-limiting example, electrical connector 32 may be a Society of Automotive Engineers (SAE) J1772 (Type 1) or J1772-2009 (Type 2) electrical connector with single or split phase modes operating at 120 to 240 volts (V) with alternating current (AC) at up to 80 amperes (A) peak current for conductive vehicle charging. Furthermore, the charging connector 32 can also be designed to meet the standards set forth in International Electrotechnical Commission (IEC) 62196-3 Fdis and/or IEC 62196-2, as well as any other presently available or hereinafter developed standards. A charge port 34 accessible on the exterior of vehicle body 12 is a wired charging interface functioning as an electrical inlet into which electrical connector 32 may be plugged or otherwise mated. This port 34 enables a user to easily connect and disconnect electric vehicle 10 to/from a readily available AC or DC source, such as a public utility power grid, via charging station 20. Charge port 34 of FIG. 1 is not limited to any particular design, and may be any type of inlet, port, connection, socket, plug, etc., that enables conductive or other types of electrical connections. A hinged charge port door (CPD) 36 on vehicle body 12 can be selectively opened and closed to access and cover the charge port 34, respectively.

As part of the vehicle charging process, the charging system may monitor wired/wireless charging availability, wireless power quality, and other related issues that may affect vehicle charging. According to the illustrated example, the vehicle ECU 26 and/or mobile charger controller 60 of FIG. 1 communicate with each other and receive sensor signals from a monitoring system, represented herein by one or more onboard vehicle-mounted sensing devices 28 of the vehicle 10 and/or one or more charger sensing devices 30 of the mobile charging station 20. In practice, this monitoring system may include a single sensor, or it may include a distributed sensor architecture with an assortment of sensors packaged at similar or alternative locations to that which are shown in the drawings. A CPD sensor 38 mounted by the charge port 34 may sense, and be polled or read by the vehicle's ECU 26 to determine, a door status (open/closed) of the CPD 36. As another option, a latching button 40, which helps to physically attach and secure the electrical connector 32 to the charge port 34, may include an internal switch (e.g., an SAE S3 type switch) that functions as a sensing device to detect whether or not the electrical connector 32 is operatively connected to the charge port 34. There are numerous other types of sensing devices that may be used, including thermal sensing devices, such as passive thermal infrared sensors, optical sensing devices, such as light and laser-based sensors, acoustic sensing devices, such as surface acoustic wave (SAW) and ultrasonic sensors, capacitive sensing devices, such as capacitive-based proximity sensors, etc.

The representative vehicle 10 of FIG. 1 may be originally equipped with a vehicle telecommunication and information ("telematics") unit 42 that wirelessly communicates (e.g., via cell towers, base stations and/or mobile switching centers (MSCs), etc.) with a remotely located or "off-board" cloud computing system 44. Acting as both a user-input device and a vehicle-output device, telematics unit 42 may be assembled with an electronic video display device 46 and assorted input controls 48 (e.g., buttons, knobs, switches, trackpads, keyboards, touchscreens, etc.). These telematics hardware components may function, at least in part, as a resident vehicle navigation system, e.g., to enable assisted and/or automated vehicle navigation, and as a human/machine interface (HMI), e.g., to enable a user to communicate with the telematics unit 42 and other systems and system components of the vehicle 10. Optional peripheral hardware may include a microphone that provides a vehicle occupant with the ability to input verbal or other auditory commands; the vehicle 10 may be furnished with an embedded voice-processing unit programmed with a computational speech recognition software module. A vehicle audio system with one or more speaker components may provide audible output to a vehicle occupant and may be either a stand-alone device dedicated for use with the telematics unit 42 or may be part of a general audio system.

With continuing reference to FIG. 1, telematics unit 42 is an onboard computing device that provides a mixture of services, both individually and through its communication with other networked devices. Telematics unit 42 may be generally composed of one or more processors, each of which may be embodied as a discrete microprocessor, an application specific integrated circuit (ASIC), a dedicated control module, etc. Vehicle 10 may offer centralized vehicle control via ECU 26 that is operatively coupled to one or more electronic memory devices 50, each of which may take on the form of a CD-ROM, magnetic disk, IC device, semiconductor memory (e.g., various types of RAM or ROM), etc., with a real-time clock (RTC). Long-range vehicle communication capabilities with remote, off-board networked devices may be provided via one or more or all of a cellular chipset/component, a navigation and location chipset/component (e.g., global positioning system (GPS) transceiver), or a wireless modem, all of which are collectively represented at 52. Close-range wireless connectivity may be provided via a short-range wireless communication device (e.g., a BLUETOOTH® unit or near field communications (NFC) transceiver), a dedicated short-range communications (DSRC) component, and/or a dual antenna, all of which are collectively represented at 54. The various communications devices described above may be configured to exchange data as part of a periodic broadcast in a Vehicle-to-Vehicle (V2V) communication system or a vehicle-to-everything (V2X) communication system, e.g., Vehicle-to-Infrastructure (V2I), Vehicle-to-Pedestrian (V2P), Vehicle-to-Device (V2D), etc.

Operation of any of the illustrated mobile charging station 20 components may be governed by an onboard or remote controller, or a distributed network of controllers and/or control modules, such as programmable charger controller 60. Control module, module, controller, control unit, electronic control unit, processor, and any permutations thereof, may be used interchangeably and synonymously to mean any one or various combinations of one or more of logic circuits, combinational logic circuit(s), Application Specific Integrated Circuit(s) (ASIC), electronic circuit(s), central processing unit(s) (e.g., microprocessor(s)), input/output circuit(s) and devices, appropriate signal conditioning and buffer circuitry, and other components to provide the described functionality, etc. Associated memory and storage (e.g., read only, programmable read only, random access, hard drive, tangible, etc.)), whether resident, remote or a combination of both, store processor-executable software and/or firmware programs or routines.

Software, firmware, programs, instructions, routines, code, algorithms, and similar terms may be used interchangeably and synonymously to mean any processor-executable instruction sets, including calibrations and look-up tables. The controller 60 may be designed with a set of control routines executed to provide desired functions. Control routines are executed, such as by a central processing unit, and are operable to monitor inputs from sensing devices and other networked control modules, and execute control and diagnostic routines to govern operation of devices and actuators. Such inputs may include vehicle speed and acceleration data, transmission gear state, vehicle route and path planning data, traffic flow data, geospatial data, vehicle dynamics data, sensor data, etc. Routines may be executed in real-time, continuously, systematically, sporadically and/or at regular intervals, for example, each 100 microseconds, 3.125, 6.25, 12.5, 25 and 100 milliseconds, etc., during vehicle use or operation.

The mobile charging stations 20 and 120 of FIGS. 1 and 2 are designed for implementation in high-charging-traffic areas, and equipped for shared charging between multiple vehicles and for deployment to multiple locations. Both chargers use locally stored hydrogen to run an internal fuel cell system that efficiently generates electrical current for recharging waiting vehicles. Either of the illustrated examples may be adapted for: (1) fully automated, self-guided and self-propelled autonomous operation; (2) human-propelled manual operation; and (3) torque-assisted, manually driven "hybrid" variants. As discussed in further detail below, disclosed mobile charging stations may travel on a floor-mounted or elevated rail system, on an over-head gantry network, on a roller, belt or chain conveyor system, or any combination thereof. In the same vein, disclosed mobile charging stations may follow radio beacons or digital breadcrumbs along a guided path, may be vision-guided by magnetic/color floor tape delineating a guided path, may be automated by centralized control, or any combination thereof. Utilizing disclosed mobile charging devices helps to mitigate site modification requirements for fixture-like EVCS, while concomitantly providing flexibility, scalability, and shareability, e.g., for mobile site or temporary site requirements.

Mobile charging station 20 of FIG. 1 may be representative of a self-propelled and self-guided system architecture in which one or more charging stations 20 are circulated amongst many locations, e.g., in a designated parking structure or parking lot, according to a pre-defined schedule or on demand by end users. As shown, the mobile charging station 20 is fabricated with a rigid charger frame 62 packaged inside of a protective charger housing 64. Rotatably mounted to the charger frame 62 are multiple road wheels 66 that engage with and propel the mobile charging station 20 across a ground surface GS-1. A prime mover 68, which may be in the nature of a motor and/or an engine, is securely mounted onto the rigid charger frame 62. Resident charger controller 60 transmits command signals to the prime mover 68 to generate propulsion torque, which is transmitted—directly or through a power transmission—to one or more of the drive wheels 66. In so doing, the prime mover 68 propels the mobile charging station 20 around the parking facility 13 to the various parking spot 11. While illustrated and described as land-based vehicles, disclosed mobile charging stations may also be configured for water and air travel and, in the same vein, adapted for use with charging aircraft and watercraft.

To produce the electric current needed to charge the vehicle 10, the mobile charging station 20 is outfit with an electrochemical fuel cell system 70 that is securely mounted to the charger frame 62, inside the charger's protective outer housing 64. The fuel cell system 70 is fluidly connected, e.g., via hose, piping, or other suitable conduit, to a hydrogen storage container 72 that is mounted to the charger frame 62, e.g., on the exterior of the housing 64 for ease of access. The hydrogen storage container 72 may take on various commercially available forms, including a liquid hydrogen storage tank, a compressed hydrogen gas storage tank, a metal hydride solid hydrogen storage tank, etc.

The fuel cell system 70 is an electrochemical apparatus generally composed of an anode electrode that receives hydrogen ($H_2$), a cathode electrode that receives oxygen ($O_2$), and an electrolyte interposed between the anode and cathode. An electrochemical reaction is induced to oxidize hydrogen molecules at the anode to generate free protons ($H+$), which are then passed through the electrolyte for reduction at the cathode with an oxidizing agent, such as oxygen. In particular, hydrogen gas is catalytically split in an oxidation half-cell reaction in the anode catalyst layer to generate free hydrogen protons and electrons. These hydrogen protons pass through the electrolyte to the cathode, where the hydrogen protons react with oxygen and electrons in the cathode to form various stack by-products. Electrons from the anode, however, cannot pass through the electrolyte; these electrons are redirected through a load, such as a vehicle's traction motor or a non-vehicular load requiring stationary power generation, before being sent to the cathode.

Electrochemical fuel cell system 70 of FIG. 1 is equipped with one or more fuel cell stacks 74, each of which is composed of multiple fuel cells of the polymer electrolyte membrane (PEM) type that are coupled, e.g., in electrical series, to one another. In the illustrated architecture, each fuel cell is a multi-layer construction typified by an anode side 76 and a cathode side 78 that are separated by a proton-conductive perfluorosulfonic acid membrane 80. An anode diffusion media layer (not shown) is provided on the anode side 76 of the PEM fuel cell stack 74, with an anode catalyst layer interposed between and operatively connecting the membrane 80 and corresponding diffusion media layer. Likewise, a cathode diffusion media layer (not shown) is provided on the cathode side 78 of the PEM fuel cell stack 74, with a cathode catalyst layer interposed between and operatively connecting the membrane 80 and diffusion media layer. These two catalyst layers cooperate with the membrane 80 to define, in whole or in part, a membrane electrode assembly (MEA).

Disclosed mobile charging stations 20, 120 may navigate the parking facility 13 using any one of several methods, such as: (1) following radio beacons 82; (2) following radio signals from a guide wire 84; (3) following colored or magnetic tape 86; and/or (4) following dedicated signage or designated landmarks 88 (e.g., parking blocks). A radio signal receiver 90, which may be in the nature of a radio frequency (RF) transceiver, is mounted to the charger frame 62 to exchange data and control signals with the mobile charger's controller 60. This radio signal receiver 90 detects radio signals emitted from a radio transmitter, such as radio beacon 82 and/or guide wire 84. These signals are indicative of a route from the charger's current location or other origin, to one or more of the charger's charging stops or other destination. The radio beacons 82 may be RF transponders that are mounted to the ground surface GS-1 or hung as fixtures from a ceiling or wall of the parking facility 13. Charger controller 60 may store in resident memory or retrieve from a centralized control server or cloud computing service 44 a route planning algorithm with geolocation diagrams that map the beacons 82 to the parking facility 13. Using the route planning tool and facility diagrams, the controller 60 is able use a derived sequence of the beacons 82 as "breadcrumbs" to navigate the mobile charging station 20 between target locations. These transponders can operate on RF spectrum, visible light spectrum, or any other suitable method.

In addition to, or as an alternative for the radio beacons 82, radio signal receiver 90 of FIG. 1 may wirelessly detect signals output by the guide wire 84 to enable the mobile charging station 20 to self-locate and self-navigate between targeted parking locations. Guide wire 84 is an electrically conductive element that is either embedded in the ground surface GS-1 of the parking facility 13, fixed to a parking structure wall, or routed overhead to provide a detectable radio signal. Processor-executable route planning algorithms utilize these signals to derive path plan data, such as a turn-by-turn list of directions, that is followed by the mobile charging station 20 to navigate the parking facility 13.

Other optional configurations may utilize alternative sensing techniques to provision mobile charger automation. For instance, the mobile charging station 20 may use a guide sensor 92 that is mounted to the underside of the charger frame 62 and wired/wirelessly connected to the controller 60. The guide sensor 92 may be an optical or magnetic sensing device that detects a guide tape 86 adhered to the ground surface GS-1 of the parking facility 13. The guide sensor 92 may include a charge-coupled device (CCD), active-pixel sensor (APS), or other suitable photodetector that detects a predetermined color (e.g., pink or orange) that corresponds to the color of the guide tape 86. The adhesive guide tape 86 may line the adjoining areas of the parking facility 13 and designate the individual parking spots that the mobile charging station 20 services. The aforementioned route planning algorithms may derive an optimal charger path, e.g., based on shortest distance, shortest travel time, first-in-first-out of vehicles, etc. The guide sensor 92 may also or alternatively detect a predefined color of paint on the floor, designated landmarks, and/or signs on the wall to visually guide the mobile charging station 20 to an intended location.

It is envisioned that the mobile charging station 20 may include a variety of optional equipment to facilitate expeditious, on-demand vehicle charging. By way of non-limiting example, an operator seat/platform 94 is shown in FIG. 1 mounted to the charger frame 62; the operator seat/platform 94 supports thereon a user (not shown) of the mobile charging station 20. A manually operated steering mechanism, such as arm-rest mounted joystick 96, allows the user to control the speed, acceleration/deceleration, and direction of travel of the mobile charging station 20. The joystick 96 operatively interfaces with a steer-by-wire steering system 98 mounted to the charger frame and operable to rotate one or more of the drive wheels 66 to thereby govern the travel direction of the charging station 20. A user input device, such as touch-screen display 99, allows the user to enter selections with and receive information from the mobile charging station 20.

Figure 3:
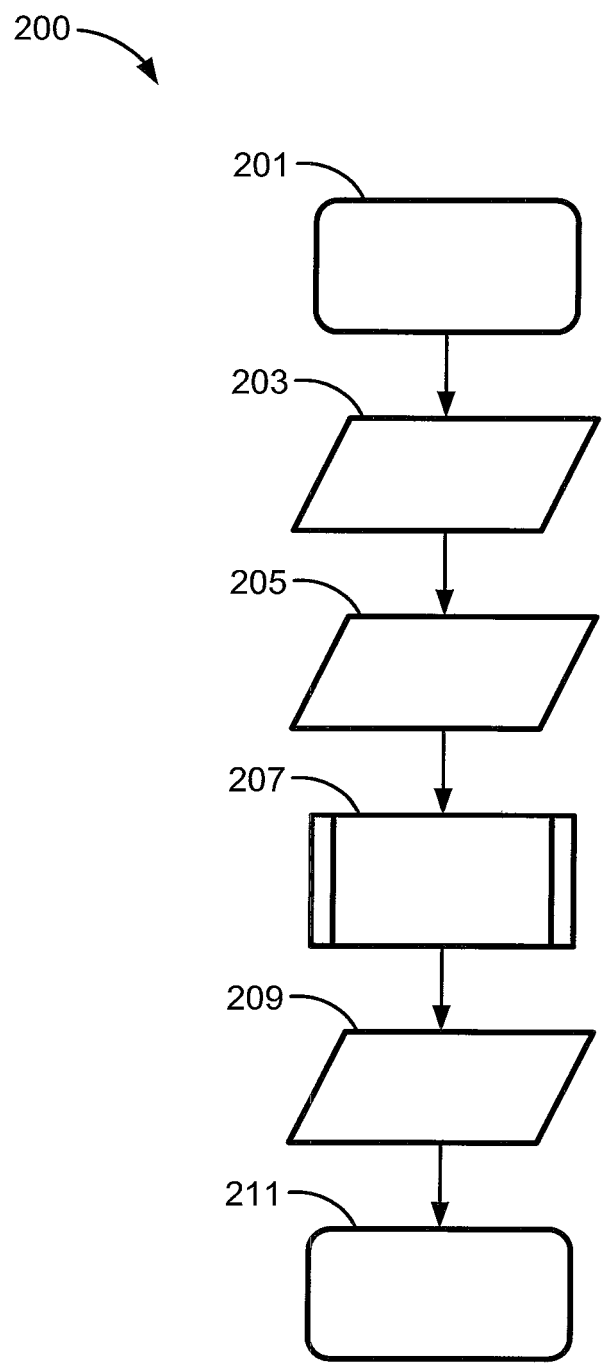
FIG. 3 is a flowchart illustrating a representative control strategy for automating operation of a mobile charging station, which may correspond to memory-stored instructions executed by a resident or remote controller, control-logic circuitry, programmable electronic control unit, or other integrated circuit (IC) device or network of IC devices in accord with aspects of the disclosed concepts.

With reference now to the flow chart of FIG. 3, an improved method or control strategy for automating operation of a deployable EVCS, such as mobile charging station 20 of FIG. 1, to provide electrical power to a rechargeable energy storage system of a motor vehicle, such as traction battery pack 14 of vehicle 10, is generally described at 200 in accordance with aspects of the present disclosure. Some or all of the operations illustrated in FIG. 3 and described in further detail below may be representative of an algorithm that corresponds to processor-executable instructions that may be stored, for example, in main or auxiliary or remote memory, and executed, for example, by an on-board or remote controller, processing unit, control logic circuit, or other module or device, to perform any or all of the above or below described functions associated with the disclosed concepts. It should be recognized that the order of execution of the illustrated operation blocks may be changed, additional blocks may be added, and some of the blocks described may be modified, combined, or eliminated.

Method 200 of FIG. 3 initializes at terminal block 201 with processor-executable instructions for a programmable controller or control module or similarly suitable processor to call up an initialization procedure for a mobile charger protocol. This routine may be executed in real-time, continuously, systematically, sporadically, and/or at regular intervals during active or inactive vehicle operation. As yet another option, block 201 may initialize responsive to a command prompt from a user or a broadcast prompt signal from a backend or middleware computing node tasked with automating operation of a mobile charger or a fleet of mobile chargers. To carry out this protocol, a resident mobile control system or a centralized mobile control system or any combination of one or more networked systems may be operable to receive, process, and synthesize pertinent information and inputs, and execute control logic and algorithms to regulate various system components to achieve desired control targets.

After receiving a charge request signal to recharge an electric-drive vehicle, e.g., causing initialization at terminal block 201, a resident or remote controller responsively begins to aggregate charger and vehicle location data at input/output block 203. Method 200 contemporaneously advances to input/output block 205 to begin accumulating, filtering, and processing sensor data from various networked system sensing devices. This may comprise radio signal receiver 90 receiving signals from the radio beacons 82, each of which may be indicative of a specific location on the route from the charger's origin to the charger's destination. In this regard, radio signal receiver 90 may receive signals from the embedded radio guide wire 84 that are indicative of charger location and alignment on the route from charger origin to destination. Moreover, the mobile charger's controller 60 may receive, via guide sensor 92 embodied as an optical or magnetic sensing device, sensor signals indicative of the route demarcated by the guide tape 86 or landmarks 88 from origin to destination.

Moving from input/output block 205 to predefined process block 207, the method 200 provides processor-executable instructions to determine charger path plan data for the mobile EVCS to traverse from its current location or designated origin to one or more charging stops or designated destinations. In addition to charger location/origin and stop/destination data for the mobile charging station, the path plan data may also include trajectory information, speed data, maintenance stop data, refueling stop data, etc. For instance, the resident charger controller 60 may determine path plan data based, in whole or in part, on the signals received from the beacons 82 or the guide wire 84, and/or data generated from the colored/magnetic tape 86 or perceived from the signage/landmarks 88. The derived path plan data may comprise steering trajectories for guiding the mobile charging station 20 from charger origin to charger destination.

Once the requisite path plan data has been generated, the method 200 continues to input/output block 209 and automates dynamic operation of the movable EVCS in order to provision the requested charging operation. As a non-limiting example, the mobile charger controller 60 of FIG. 1 may transmit one or more commands signals to the prime mover 68 to propel the mobile charging station 20 from its current/designated origin to a requested/designated destination. Controller 60 may concurrently transmit one or more command signals to the onboard steering system 98 to guide the mobile charging station 20 in accordance with the determined steering trajectories. When the mobile charging station 20 reaches a final or intermittent charging destination, the charger controller 60 enables the electrochemical fuel cell system 70 to output electrical current to the traction battery pack of the electric-drive vehicle via an electrical coupling mechanism (e.g., wireless charging pad 24 or plug-in electrical connector 32 of FIG. 1). At this juncture, the method 200 may proceed from block 209 to terminal block 211 and terminate, or may loop back to block 201 and run in a continuous loop.

Mobile charging station 120 of FIG. 2 may be representative of a manually propelled and guided mobile EVCS architecture for recharging electric-drive vehicles. Although differing in appearance, the representative mobile charging station 120 of FIG. 2 may include any of the options and features described above with respect to the charging station 20 of FIG. 1, and vice versa. For instance, the mobile charging station 120 is fabricated with a rigid charger frame 62 that is packaged inside of a protective outer housing 64. In this example, however, the mobile charging station 120 is deployed to multiple locations within a known parking area by physically pushing or pulling the station 120 or via a manually-powered drive mechanism (e.g., a hand or foot-cranked chain drive system). Rotatably mounted to the charger frame 62 are multiple rail wheels 166 that movably mount the mobile charging station 120 onto the floor-mounted rail tracks 124 of a rail network 122. For at least some alternative architectures, the rail wheels 166 movably mount the charger frame 62 onto the wall or ceiling-mounted beams 125 of a girder network 123.

The rail network 122 or girder network 123 may be added to the parking facility 13 to allow easier and controlled movement of the mobile charging station 120 without obstructing any of the parking spots 11. Additionally, the rail and girder networks 122, 123 may be employed to prevent users from moving the mobile charging station 120 outside of designated areas. Likewise, the rail and girder networks 122, 123 may be employed to prevent users from positioning the mobile charging station 120 in a manner that would obstruct pedestrian walkways, first responder access, Occupational Safety and Health Administration (OSHA) clearances around electrical infrastructure, or handicapped parking. Restricted movement via the rail and girder networks 122, 123 also helps to prevent users from inadvertently running the charging station 120 into parked cars or damaging the parking infrastructure. Individual mobile chargers may be moved by individual vehicle operators, by an existing valet-type service, or by a third-party vendor who is paid per task (e.g., gig economy participants). The rails 124 may be dedicated metallic rails for low rolling resistance, cast concrete for minimal cost and easy relocation, existing guard rails or parking blocks, etc. The rails may serve multiple purposes to segregate pedestrians and vehicular traffic, as parking stops for cars, or as fall prevention protection for pedestrians or vehicles.

In addition to the fully automated and manually propelled mobile charging stations described above, it is envisioned that "hybrid" mobile charger variants may comprise torque-assisted, manually driven powertrains. In this version, the above-described mobile charging stations 20, 120 may be sufficiently compact and light-weight to enable human-powered movement, yet contains a minimal level of onboard propulsion hardware to facilitate starting and stopping the charger. For hybrid variants, the mobile charging station relies on an operator for steering and general propulsion; a resident motor or engine provides assistive torque, e.g., to overcome inertia and for uphill travel. Similar to an automobile, the mobile charging stations of this disclosure may be equipped with power steering, power braking and any other relevant operator-assistance subsystem.

Additional options may include the mobile charging station operating on pneumatic tires and having the ability to access any normal parking space in a lot or garage, including negotiating ramps, curbs, speed bumps and the like. An operator may walk alongside, stand on, or sit on or in the mobile charger to guide it to the intended parking spot. A collection of mirrors, digital cameras, proximity sensors, etc., may be added to the mobile charger to help the operator successfully place the mobile charger without causing damage to the charger, the vehicle, or objects around either. The mobile charger may be upsized so as to be a small vehicle intended only to operate within the confines of the parking area (e.g., not for operation on public roadways). The propulsion element may be detached from one mobile charging station and shared between many mobile chargers.

Figure 4:
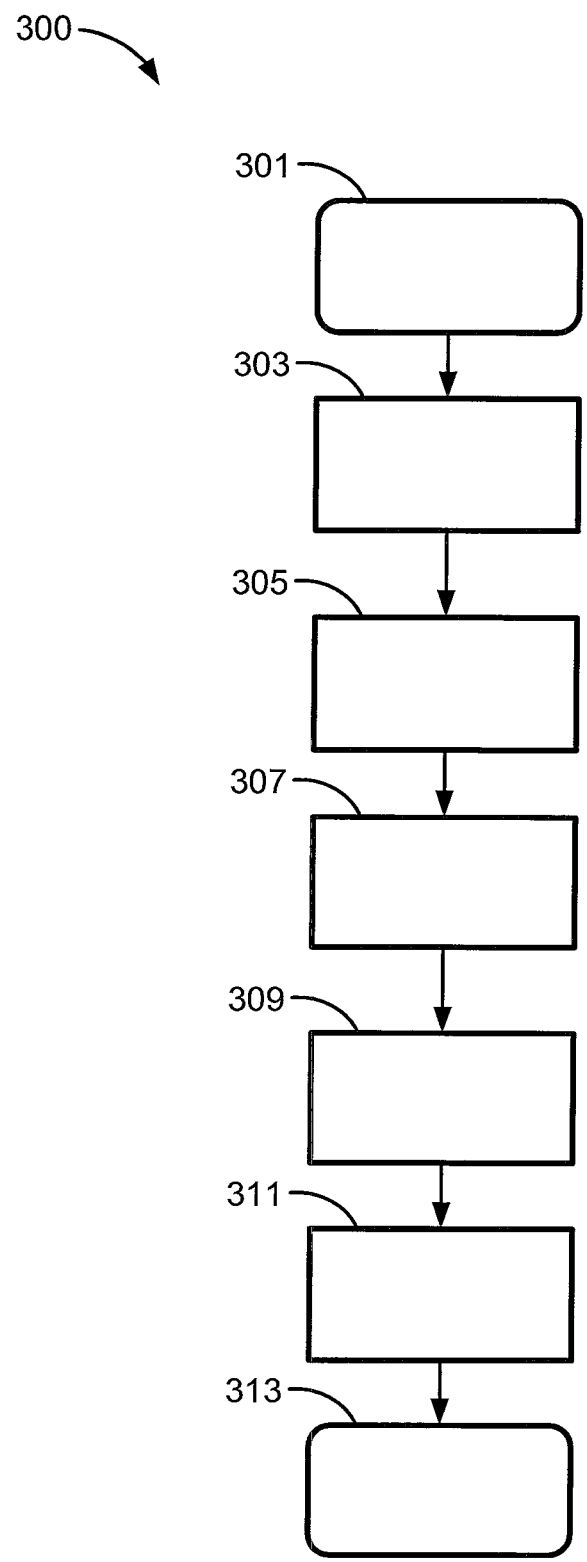
FIG. 4 is a flowchart illustrating a representative manufacturing protocol for assembling mobile charging stations, which may correspond to memory-stored instructions executed by a resident or remote controller, control-logic circuitry, programmable electronic control unit, or other integrated circuit (IC) device or network of IC devices in accord with aspects of the disclosed concepts.

With reference now to the flow chart of FIG. 4, an improved manufacturing method or work flow strategy for assembling a deployable EVCS, such as mobile charging stations 20, 120 of FIG. 1 or FIG. 2, is generally described at 300 in accordance with aspects of the present disclosure. Some or all of the operations illustrated in FIG. 3 and described in further detail below may be representative of an algorithm that corresponds to processor-executable instructions that may be stored, for example, in main or auxiliary or remote memory, and executed, for example, by a controller, processing unit, or other module or device, to perform the above or below described functions associated with the disclosed concepts. It should be recognized that the order of execution of the illustrated operation blocks may be changed, additional blocks may be added, and some of the blocks described may be modified, combined, or eliminated.

The method 300 of FIG. 4 initializes at terminal block 301. At process block 303, the method 300 attaches a plurality of drive wheels, such as drive wheels 66 of FIG. 1 or rail wheels 166 of FIG. 2, to a rigid support frame for a mobile charger, such as charger frame 62. Method 300 advances to process block 305 and mounts a prime mover, such as a 2-stroke 225 cc engine or a 55 hp polyphaser permanent magnet (PM) motor, to the charger frame. Process block 305 may concurrently include drivingly connecting the prime mover may to one or more of the wheels. Prior to, contemporaneous with, or after mounting the prime mover, method 300 mounts a hydrogen storage container and an electrochemical fuel cell to the charger frame at process block 307. Process block 307 may further comprise fluidly connecting the fuel cell to the hydrogen storage container. The fuel cell may be tested to ensure that it is operable to oxidize hydrogen received from the hydrogen storage container and thereby generate electrical current.

With continuing reference to the method 300 of FIG. 4, process block 309 includes mounting an electrical coupling mechanism to the charger frame, and concurrently electrically connecting it to the fuel cell system in order to receive and transmit electric current received therefrom. Method 300 thereafter advances to process block 311 and communicatively connects the various electronic devices of the mobile charging station to a mobile charger controller. If the mobile charger controller is resident to the station, it may be mounted to the charger frame, packaged inside the mobile charging station's protective outer housing. At this juncture, the method 300 moves to terminal block 313 and terminates or cycles back to terminal block 301 and runs and a continuous loop.

Many of the above-described fast charging station (FCS) mobile DC rapid chargers may be implemented in existing infrastructure without being installed as permanent fixtures and without retrofitting the infrastructure to accommodate the addition of multiple high-use electrical loads. Additionally, these FCS DC rapid chargers may be deployed in urban, suburban, and rural settings with minimal disruption to existing real estate and without modification to existing infrastructure. Unlike battery-driven and gas-driven generators, which can typically charge 3-5 vehicles before requiring maintenance, disclosed FCS DC rapid chargers offer about 660-3200 kilowatt-hour (kWh) sealable energy at about 160 kilowatt (kW) maximum power output to fully charge approximately 10-50 vehicles on a single tank (e.g., about 30-200 kg hydrogen trailer). Advantageously, disclosed FCS solutions are scalable to match supply with demand in near real-time to maximize charger utilization, e.g., for seasonal applications (e.g., ski season, beach season, travel rest stops, etc.) and event-driven applications (e.g., concert and sporting event parking, festival parking, etc.).

Aspects of this disclosure may be implemented, in some embodiments, through a computer-executable program of instructions, such as program modules, generally referred to as software applications or application programs executed by any of a controller or the controller variations described herein. Software may include, in non-limiting examples, routines, programs, objects, components, and data structures that perform particular tasks or implement particular data types. The software may form an interface to allow a computer to react according to a source of input. The software may also cooperate with other code segments to initiate a variety of tasks in response to data received in conjunction with the source of the received data. The software may be stored on any of a variety of memory media, such as CD-ROM, magnetic disk, bubble memory, and semiconductor memory (e.g., various types of RAM or ROM).

Moreover, aspects of the present disclosure may be practiced with a variety of computer-system and computer-network configurations, including multiprocessor systems, microprocessor-based or programmable-consumer electronics, minicomputers, mainframe computers, and the like. In addition, aspects of the present disclosure may be practiced in distributed-computing environments where tasks are performed by resident and remote-processing devices that are linked through a communications network. In a distributed-computing environment, program modules may be located in both local and remote computer-storage media including memory storage devices. Aspects of the present disclosure may therefore be implemented in connection with various hardware, software or a combination thereof, in a computer system or other processing system.

Any of the methods described herein may include machine readable instructions for execution by: (a) a processor, (b) a controller, and/or (c) any other suitable processing device. Any algorithm, software, control logic, protocol or method disclosed herein may be embodied as software stored on a tangible medium such as, for example, a flash memory, a CD-ROM, a floppy disk, a hard drive, a digital versatile disk (DVD), or other memory devices. The entire algorithm, control logic, protocol, or method, and/or parts thereof, may alternatively be executed by a device other than a controller and/or embodied in firmware or dedicated hardware in an available manner (e.g., implemented by an application specific integrated circuit (ASIC), a programmable logic device (PLD), a field programmable logic device (FPLD), discrete logic, etc.). Further, although specific algorithms are described with reference to flowcharts depicted herein, many other methods for implementing the example machine-readable instructions may alternatively be used.

Aspects of the present disclosure have been described in detail with reference to the illustrated embodiments; those skilled in the art will recognize, however, that many modifications may be made thereto without departing from the scope of the present disclosure. The present disclosure is not limited to the precise construction and compositions disclosed herein; any and all modifications, changes, and variations apparent from the foregoing descriptions are within the scope of the disclosure as defined by the appended claims. Moreover, the present concepts expressly include any and all combinations and subcombinations of the preceding elements and features.

What is claimed:

1. A mobile charging station for recharging a traction battery pack of an electric-drive vehicle, the mobile charging station comprising:
   a charger frame with a plurality of drive wheels;
   a steering system operable to steer the mobile charging station;
   a prime mover mounted to the charger frame and operable to drive one or more of the drive wheels to thereby propel the mobile charging station;
   a hydrogen storage container mounted to the charger frame;
   an electrochemical fuel cell mounted to the charger frame and fluidly connected to the hydrogen storage container, the fuel cell being configured to oxidize hydrogen received from the hydrogen storage container and thereby generate electrical current;
   an electrical coupling mechanism mounted to the charger frame and configured to operatively connect the fuel cell to the traction battery pack of the electric-drive vehicle;
   a radio signal receiver mounted to the charger frame and configured to communicate with a radio transmitter, the radio transmitter including a plurality of radio beacons distributed about a parking area; and
   a mobile charger controller communicatively connected to the prime mover, the radio signal receiver, and the fuel cell, the mobile charger controller being programmed to:
     receive a charge request signal to recharge the electric-drive vehicle;
     responsive to receiving the charge request signal, determine charger path plan data including a charger origin and destination for the mobile charging station;

command the prime mover to propel the mobile charging station from the charger origin to the charger destination;

receive, via the radio signal receiver from the radio beacons, radio signals each indicative of a location on a route from the charger origin to the charger destination;

determine, using the received radio signals, steering trajectories for guiding the mobile charging station from the charger origin to the charger destination;

transmit command signals to the steering system to guide the mobile charging station in accordance with the determined steering trajectories; and enable the fuel cell to transmit electrical current to the traction battery pack of the electric-drive vehicle via the electrical coupling mechanism.

2. The mobile charging station of claim 1, wherein the drive wheels are configured to movably mount the charger frame onto a rail track of a rail network.

3. The mobile charging station of claim 1, wherein the drive wheels are configured to engage with and propel the charger frame across a ground surface.

4. The mobile charging station of claim 1, wherein the drive wheels are configured to movably mount the charger frame onto a wall-mounted or ceiling-mounted beam of a girder network.

5. The mobile charging station of claim 1, wherein the steering system is mounted to the charger frame and operable to rotate at least one of the drive wheels to thereby govern a travel direction of the mobile charging station.

6. The mobile charging station of claim 1, wherein the radio transmitter further includes a radio wire embedded in a ground surface of the parking area across which the mobile charging station travels, and wherein the mobile charger controller is further programmed to:

receive, via the radio signal receiver from the embedded radio wire, one or more radio wire signals indicative of a charger alignment of the mobile charging station on the route from the charger origin to the charger destination;

determine, based at least in part on the received radio wire signals, additional steering trajectories for guiding the mobile charging station from the charger origin to the charger destination; and transmit additional command signals to the steering system to guide the mobile charging station in accordance with the determined additional steering trajectories.

7. The mobile charging station of claim 1, further comprising a guide sensor mounted to the charger frame and communicatively connected to the mobile charger controller, the guide sensor being configured to detect a guide tape adhered to a ground surface of the parking area across which the mobile charging station travels.

8. The mobile charging station of claim 7, wherein the guide sensor includes a photodetector configured to detect a predetermined color corresponding to a color of the guide tape, and wherein the mobile charger controller is further programmed to:

receive, via the photodetector, sensor signals indicative of individual parking spots demarcated by the guide tape;

determine, based at least in part on the sensor signals, additional steering trajectories for guiding the mobile charging station from the charger origin to the charger destination; and transmit command signals to the steering system to guide the mobile charging station in accordance with the determined additional steering trajectories.

9. The mobile charging station of claim 1, wherein the hydrogen storage container includes a liquid hydrogen storage tank, a compressed hydrogen gas storage tank, and/or a metal hydride solid hydrogen storage tank.

10. The mobile charging station of claim 1, wherein the electrical coupling mechanism includes a plug-in electrical connector and/or an electromagnetic wireless charging pad.

11. The mobile charging station of claim 1, further comprising:

a seat and/or a platform mounted to the charger frame and configured to support thereon a user of the mobile charging station; and a manually operated steering mechanism mounted to the charger frame and configured to govern a travel direction of the mobile charging station.

12. The mobile charging station of claim 1, wherein the prime mover includes a motor and/or an engine.

13. The mobile charging station of claim 1, wherein the mobile charger controller is further configured to retrieve a route planning algorithm and geolocation diagrams that map the radio beacons to the parking area.

14. The mobile charging station of claim 13, wherein the mobile charger controller is further configured to:

determine a sequence of the radio beacons from the charger origin to the charger destination using the route planning algorithm and the geolocation diagrams; and navigate, using the determined sequence of the radio beacons, the mobile charging station between predefined target locations on the route.

15. A method of assembling a mobile charging station for recharging a traction battery pack of an electric-drive vehicle, the method comprising:

attaching a plurality of drive wheels to a charger frame;

mounting a steering system to the charger frame;

mounting a prime mover to the charger frame, the prime mover being operable to drive one or more of the drive wheels to thereby propel the mobile charging station;

mounting a hydrogen storage container to the charger frame;

mounting an electrochemical fuel cell to the charger frame;

fluidly connecting the fuel cell to the hydrogen storage container, the fuel cell being configured to oxidize hydrogen received from the hydrogen storage container and thereby generate electrical current;

mounting an electrical coupling mechanism to the charger frame, the electrical coupling mechanism being configured to operatively connect the fuel cell to the traction battery pack of the electric-drive vehicle;

mounting a radio signal receiver to the charger frame, the radio signal receiver being configured to communicate with radio beacons distributed about a parking area; and communicatively connecting a mobile charger controller to the prime mover, the radio signal receiver, and the fuel cell, the mobile charger controller being programmed to:

receive a charge request signal to recharge the electric-drive vehicle;

responsive to receiving the charge request signal, determine charger path plan data including a charger origin and destination for the mobile charging station;

command the prime mover to propel the mobile charging station from the charger origin to the charger destination;

receive, via the radio signal receiver from the radio beacons, radio signals each indicative of a location on a route from the charger origin to the charger destination;

determine, using the received radio signals, steering trajectories for guiding the mobile charging station from the charger origin to the charger destination;

transmit command signals to the steering system to guide the mobile charging station in accordance with the determined steering trajectories; and enable the fuel cell to transmit electrical current to the electric-drive vehicle via the electrical coupling mechanism.

16. A mobile charging system for recharging multiple electric-drive vehicles, the mobile charging system comprising:

a rail network and/or a guided pathway leading to a plurality of parking spots within a parking area configured to accommodate the electric-drive vehicles;

a plurality of mobile charging stations operable to recharge traction battery packs of the electric-drive vehicles, each of the mobile charging stations including:

a charger frame with a plurality of drive wheels;

a steering system operable to steer the mobile charging station;

a prime mover mounted to the charger frame and operable to drive one or more of the drive wheels to thereby propel the mobile charging station;

a hydrogen storage container mounted to the charger frame;

an electrochemical fuel cell mounted to the charger frame and fluidly connected to the hydrogen storage container, the fuel cell being configured to oxidize hydrogen received from the hydrogen storage container and thereby generate electrical current;

an electrical coupling mechanism mounted to the charger frame and configured to operatively connect the fuel cell to the electric-drive vehicles; and a radio signal receiver mounted to the charger frame and configured to communicate with a radio transmitter, the radio transmitter including a plurality of radio beacons distributed about the parking area; and a mobile charger controller communicatively connected to the plurality of mobile charging stations, the mobile charger controller being programmed to:

receive a charge request signal to recharge one of the electric-drive vehicles;

responsive to receiving the charge request signal, determine charger path plan data including a charger origin and a charger destination for one of the mobile charging stations;

command the prime mover to propel the one of the mobile charging stations from the charger origin to the charger destination;

receive, from the radio beacons via the radio signal receiver of the one of the mobile charging stations, radio signals each indicative of a location on a route from the charger origin to the charger destination;

determine, using the received radio signals, steering trajectories for guiding the one of the mobile charging stations on the route;

transmit command signals to the steering system to guide the one of the mobile charging stations in accordance with the determined steering trajectories; and enable the fuel cell of the one of the mobile charging stations to transmit electrical current to the electric-drive vehicle via the electrical coupling mechanism.

17. The mobile charging system of claim 16, wherein the mobile charging system includes the rail network, and wherein the drive wheels of the mobile charging stations movably mount the charger frames onto rail tracks of the rail network.

18. The mobile charging system of claim 16, wherein each of the steering systems is mounted to a respective one of the charger frames and is operable to rotate at least one of the drive wheels to thereby govern a travel direction of a respective one of the mobile charging stations.

19. The mobile charging system of claim 16, wherein the mobile charging system includes the guided pathway, the guided pathway mounting thereon the radio transmitter, and wherein the drive wheels of each of the mobile charging stations are configured to engage with and propel the charger frame across the guided pathway.

20. The mobile charging system of claim 16, wherein the radio transmitter further includes a radio wire embedded in a ground surface of the parking area, and wherein each of the radio signal receivers is further configured to receive, from the embedded radio wire, radio wire signals indicative of a charger alignment of the mobile charging station on the route from the charger origin to the charger destination.

* * * * *